United States Patent
Hwang et al.

(10) Patent No.: US 8,120,299 B2
(45) Date of Patent: Feb. 21, 2012

(54) MOTOR CONTROLLER OF AIR CONDITIONER

(75) Inventors: Sun Ho Hwang, Changwon-si (KR); Han Su Jung, Changwon-si (KR); Chung Hun Lee, Changwon-si (KR)

(73) Assignee: LG Electronics Inc., Seoul (KR)

( * ) Notice: Subject to any disclaimer, the term of this patent is extended or adjusted under 35 U.S.C. 154(b) by 635 days.

(21) Appl. No.: 12/292,479

(22) Filed: Nov. 19, 2008

(65) Prior Publication Data

US 2009/0146591 A1    Jun. 11, 2009

(30) Foreign Application Priority Data

Nov. 20, 2007    (KR) .................. 10-2007-0118734

(51) Int. Cl.
*G05F 1/70*    (2006.01)
(52) U.S. Cl. ...................... 318/438; 318/729
(58) Field of Classification Search ............... 318/400.3, 318/437, 438, 254.1, 254.2, 701, 729
See application file for complete search history.

(56) References Cited

U.S. PATENT DOCUMENTS

| | | | | |
|---|---|---|---|---|
| 3,840,799 | A * | 10/1974 | Macko et al. | 318/722 |
| 5,272,429 | A * | 12/1993 | Lipo et al. | 318/808 |
| 5,663,627 | A * | 9/1997 | Ogawa | 318/803 |
| 5,994,869 | A * | 11/1999 | Becerra | 318/729 |
| 6,181,539 | B1 * | 1/2001 | Maejima et al. | 361/22 |
| 6,198,240 | B1 * | 3/2001 | Notohara et al. | 318/268 |
| 6,771,522 | B2 * | 8/2004 | Hayashi et al. | 363/71 |
| 7,250,742 | B2 * | 7/2007 | Li | 323/207 |
| 7,532,491 | B2 * | 5/2009 | Lim et al. | 363/34 |

* cited by examiner

*Primary Examiner* — Bentsu Ro
(74) *Attorney, Agent, or Firm* — McKenna Long & Aldridge LLP

(57) ABSTRACT

The present invention relates to a motor controller of an air conditioner, including an inverter including a plurality of switching elements and adapted to convert a DC voltage, input through switching operations of the switching elements, into an AC voltage and supply the converted voltage to a motor, a power calculation unit that calculates electric power applied to the motor, an angle calculation unit that calculates an optimal phase angle of a current command value based on the calculated electric power; and a microcomputer that outputs a switching control signal to control the switching elements of the inverter based on the optimal phase angle.

6 Claims, 4 Drawing Sheets

MOTOR CONTROLLER OF AIR CONDITIONER

CROSS-REFERENCE TO RELATED APPLICATION

This application claims the benefit of Korean Patent Application No. 10-2007-118734, filed on Nov. 20, 2007, which is hereby incorporated by reference in its entirety as if fully set forth herein.

BACKGROUND OF THE INVENTION

1. Technical Field

The present invention relates to a motor controller of an air conditioner, and more specifically to a motor controller of an air conditioner, which can decide an optimal phase angle of a current command value simply in real-time.

2. Background Art

An air conditioner is an apparatus disposed in space, such as rooms, dining rooms, office rooms, and shops, and adapted to control temperature, moisture, cleaning and air stream of the air in order to maintain pleasant indoor environments.

An air conditioner is generally divided into a unit type and a separate type. The unit type and the separate type are identical in terms of their functions. The unit type includes an integrated cooling and heat-dissipation function and is installed in a wall of a house or hung on a wall. In the separate type, an indoor unit having the cooling/heating functions is installed indoors and an outdoor unit having the heat-dissipation and compression functions is installed outdoors and thereafter both the units are connected by refrigerant ducts.

Meanwhile, the air conditioner uses motors in a compressor, fans, and so on and includes a motor controller for driving them. The motor controller of the air conditioner converts input commercial AC power into DC power, converts the DC power into commercial AC power having a specific frequency, and supplies the AC power to the motors in order to control the motors for the compressor, fans, and so on.

To control this air conditioner, a switching control signal to drive an inverter is applied to the air conditioner. A variety of schemes for enabling the phase angle of a current command value to have an optimal value when the switching control signal is generated have been discussed.

SUMMARY OF THE INVENTION

A feature of the present invention is to provide a motor controller of an air conditioner, which can decide an optimal phase angle of a current command value simply in real-time.

A motor controller of an air conditioner according to an exemplary embodiment of the present invention includes an inverter including a plurality of switching elements and adapted to convert a DC voltage, input through switching operations of the switching elements, into an AC voltage and supply the converted voltage to a motor, a power calculation unit that calculates electric power applied to the motor, an angle calculation unit that calculates an optimal phase angle of a current command value based on the calculated electric power; and a microcomputer that outputs an inverter switching control signal to control the switching elements of the inverter based on the optimal phase angle.

A motor controller of an air conditioner according to an exemplary embodiment of the present invention includes an inverter including a plurality of switching elements and adapted to convert a DC voltage, input through switching operations of the switching elements, into an AC voltage and supply the converted voltage to a motor, an angle calculation unit that calculates an optimal phase angle of a current command value based on an output current flowing through the motor, and a microcomputer that outputs an inverter switching control signal to control the switching elements of the inverter based on the optimal phase angle.

A motor controller of an air conditioner in accordance with an embodiment of the present invention can decide an optimal phase angle of a current command value simply. Further, an optimal phase angle of a current command value can be decided in real-time.

DETAILED DESCRIPTION OF THE PREFERRED EMBODIMENTS

Hereafter, embodiments of the present invention will be described in detail with reference to the accompanying drawings.

Figure 1:
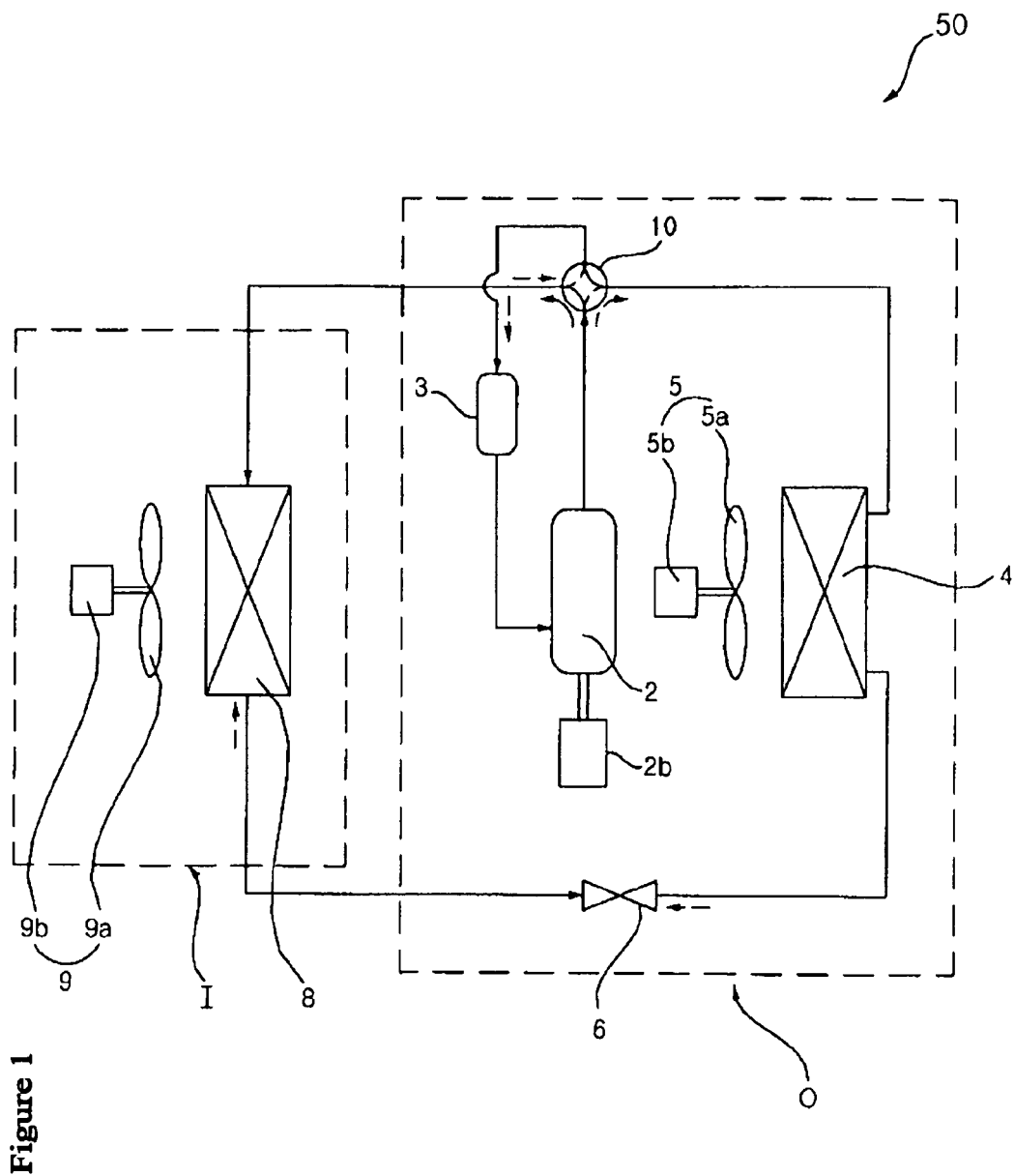
FIG. 1 is a schematic view of an air conditioner pertinent the present invention.

FIG. 1 is a schematic view of an air conditioner pertinent to the present invention.

Referring to the drawing, an air conditioner 50 is largely divided into an indoor unit 1 and an outdoor unit O.

The outdoor unit O includes a compressor 2 functioning to compress refrigerant, a motor 2b for the compressor for driving the compressor, an outdoor-side heat exchanger 4 functioning to dissipate heat of compressed refrigerant, an outdoor ventilation fan 5, including an outdoor fan 5a disposed on one side of the outdoor heat exchanger 5 and configured to accelerate heat dissipation of refrigerant and a motor 5b for rotating the outdoor fan 5a, an expansion mechanism 6 for expanding condensed refrigerant, a cooling/heating switching valve 10 for switching the flow passage of compressed refrigerant, an accumulator 3 for temporarily storing vaporized refrigerant, removing moisture and alien substance from the refrigerant and supplying refrigerant of a specific pressure to the compressor, and so on.

The indoor unit 1 includes an indoor-side heat exchanger 8 disposed indoor and performing a cooling/heating function, an indoor ventilation fan 9 disposed on one side of the indoor-side heat exchanger 8 and including an indoor fan 9a for accelerating heat dissipation of refrigerant and a motor 9b for rotating the indoor fan 9a, and so on.

At least one indoor-side heat exchanger 8 can be installed. The compressor 2 can employ at least one of an inverter compressor and a constant speed compressor. Further, the air conditioner 50 can be constructed as a cooling device for cooling the indoor or a heat pump for cooling or heating the indoor.

Meanwhile, the motor in the motor controller of the air conditioner in accordance with an embodiment of the present invention can be each of motor 2b, 5b, and 9b for operating the compressor, the outdoor fan, and the indoor fan.

Figure 2:
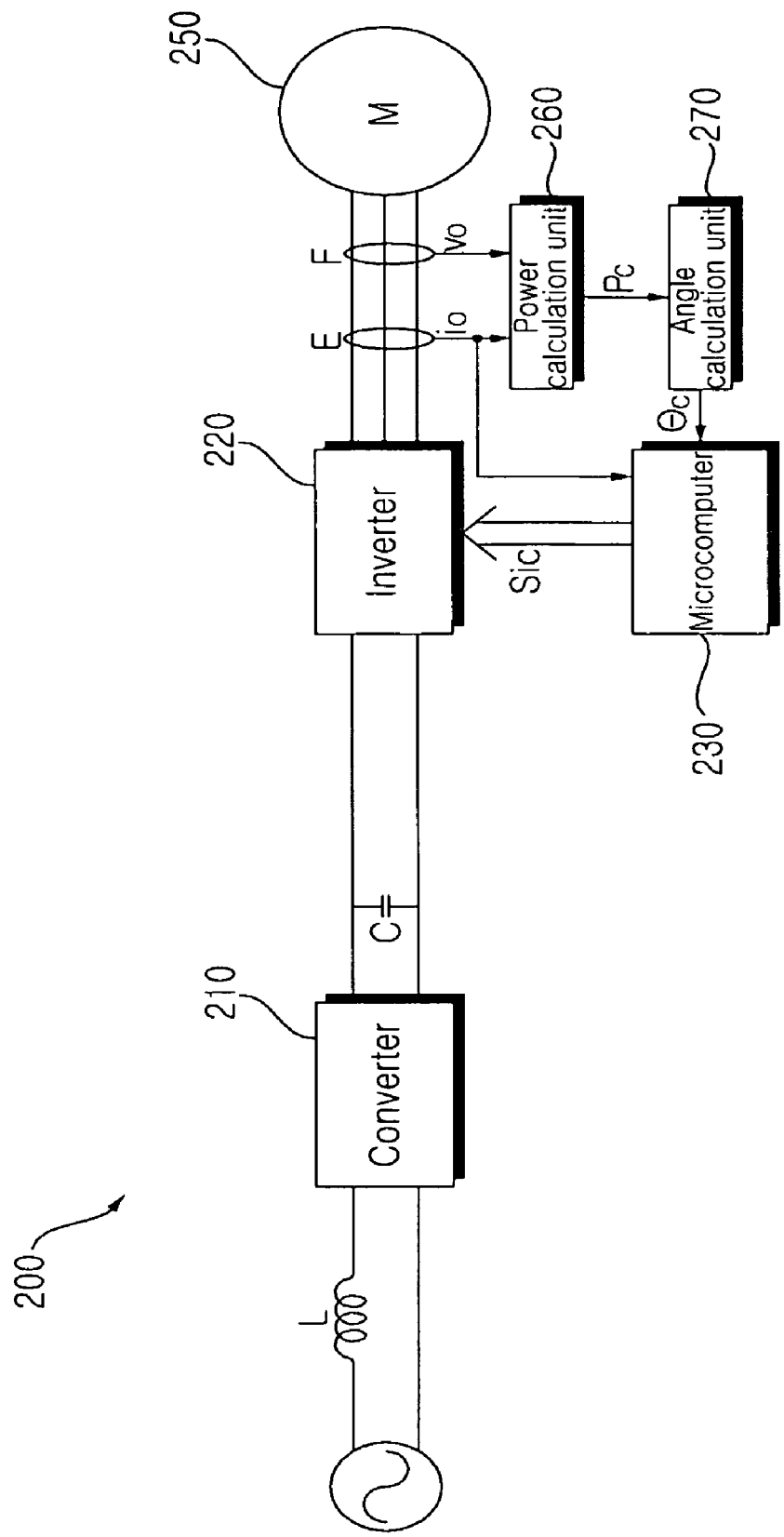
FIG. 2 is a block diagram showing a motor controller of an air conditioner in accordance with an embodiment of the present invention.

FIG. 2 is a block diagram showing the motor controller of the air conditioner in accordance with an embodiment of the present invention.

Referring to the drawing, the motor controller 200 of the air conditioner in accordance with an embodiment of the present invention includes an inverter 220, a microcomputer 230, a power calculation unit 260, and an angle calculation unit 270. The motor controller 200 of the air conditioner in accordance with an embodiment of the present invention 200 may further include output current detection means E and output voltage detection means F. The motor controller 200 may further include a converter 210, a reactor L, a smoothing capacitor C, and so on.

The reactor L is disposed between commercial AC power and the converter 210 and performs power factor correction or a boosting operation. The reactor L can also function to limit the harmonic current through high-speed switching of the converter 210.

The converter 210 converts the commercial AC power, passing through the reactor L, into DC power and outputs converted DC power. Although, in the drawing, the commercial AC power has been illustrated as single-phase AC power, it may be three-phase AC power. An internal configuration of the converter 210 may vary depending on the type of commercial AC power. For example, in the case of single-phase AC power, a half-bridge type converter having two switching elements and four diodes connected may be used. In the case of three-phase AC power, six switching elements and six diodes may be used. The converter 210 includes a plurality of switching elements and performs a boosting operation, power factor improvements and DC power conversion through the switching operation.

The smoothing capacitor C is connected to the output terminal of the converter 210 and functions to smooth converted DC power output from the converter 210. The output terminal of the converter 210 is hereinafter referred to as a dc terminal or a dc link terminal. The DC voltage smoothed at the dc terminal is applied to the inverter 220.

The inverter 220 includes a plurality of inverter switching elements. The inverter 220 converts the smoothed DC power into commercial AC power having a specific frequency through the on/off operations of the switching elements and outputs the converted AC power. More specifically, an upper arm switching element and a lower arm switching element, which are connected in series, forms one pair. A total of three pairs of the upper and lower arm switching elements are connected in parallel. The three-phase AC power output from the inverter 220 is applied to each phase of a three-phase motor 250.

Here, the three-phase motor 250 is equipped with a stator and a rotor. Each phase AC power having a specific frequency is applied to the coils of the stator of each phase, so that the rotor is rotated. Types of the three-phase motor 250 can be various such as an induction motor, a BLDC motor, and a synRM motor.

The output current detection means E detects an output current io flowing through the motor 250. The output current detection means E may be located in at least one phase between the inverter 220 and the motor 250. The output current detection means E may employ a current sensor, a current transformer (CT), a shunt resistor or the like for current detection. Further, the output current detection means E may be a shunt resistor having one terminal connected to at least one of the three lower arm switching elements of the inverter 220. The detected output current io is input to the microcomputer 230 and the power calculation unit 260.

The output voltage detection means F detects an output voltage vo applied to the motor 250. The output voltage detection means F may be located in at least one phase between the inverter 220 and the motor 250. A voltage sensor, a resistor element or the like may be used as the output voltage detection means F for voltage detection. The detected output voltage vo is input to the power calculation unit 260 for power calculation.

The power calculation unit 260 calculates output power Pc based on the output current io from the output current detection means E and the output voltage vo from the output voltage detection means F. The power calculation unit 260 can calculate the output power Pc of each phase of the three-phase motor. The power calculation unit 260 can also calculate output power Pc in real-time. The calculated output power Pc is applied to the angle calculation unit 270.

The angle calculation unit 270 calculates an optimal phase angle θc of a current command value based on the calculated power Pc. The optimal phase angle θc of the current command value may be a phase angle when the amount of the calculated power Pc is a minimum. That is, the optimal phase angle θc of the current command value can be decided at the inflection point of calculated power.

Meanwhile, calculated power of each phase of the motor 250 can be axially transformed into d,q axes, that is, rotating reference frames. The optimal phase angle θc of the current command value can be decided based on power axially transformed into the d,q axes. The optimal phase angle θc of the current command value is simply decided based on the electric power Pc calculated in real-time, as described above. Meanwhile, the calculated optimal phase angle θc is input to the microcomputer 230 and used to generate a switching control signal Sic.

The microcomputer 230 may output the switching control signal Sic in order to control the inverter 220. The switching control signal Sic is a switching control signal for PWM and is generated based on the output current io, detected in the output current detection means E, and the calculated optimal phase angle θc.

A detailed operation of the microcomputer 230 will be described later on with reference to FIG. 3.

Meanwhile, the motor controller 200 of the air conditioner in accordance with an embodiment of the present invention may further include dc terminal voltage detection means for detecting a dc terminal voltage across the smoothing capacitor C. The detected dc terminal voltages may be used to generate a converter switching control signal to control the switching operation of the converter. Here, the converter switching control signal can be generated in the same microcomputer as that of the microcomputer 230, but may also be generated in a different microcomputer from that of the same microcomputer.

Figure 3:
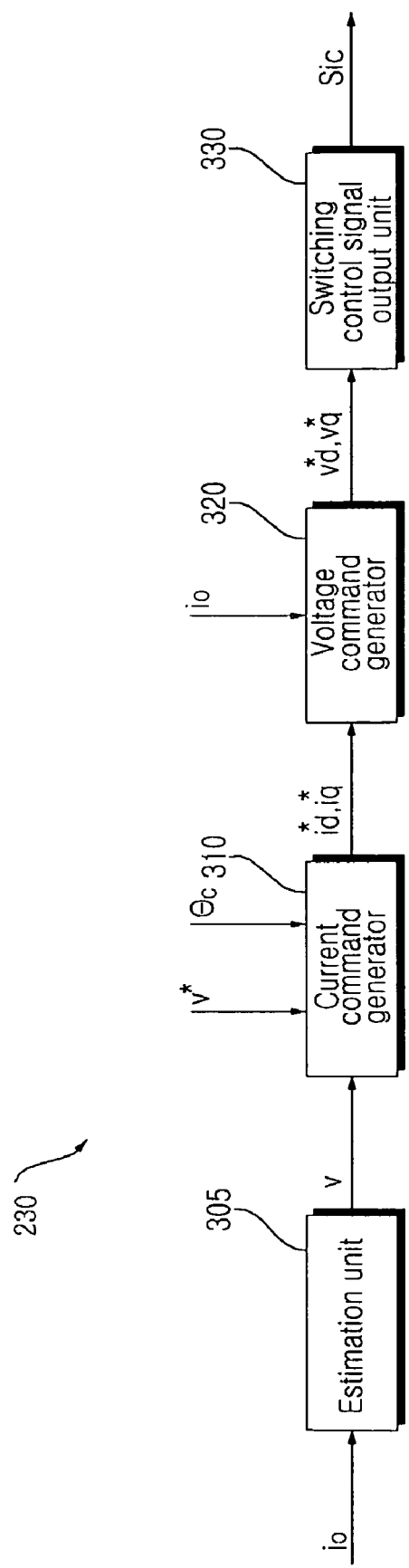
FIG. 3 is an internal block diagram of a microcomputer of FIG. 2.

FIG. 3 is an internal block diagram of a microcomputer of FIG. 2.

Referring to the drawing, the microcomputer 230 includes an estimation unit 305, a current command generator 310, a voltage command generator 320, and a switching control signal output unit 330.

The estimation unit 305 estimates a rotor velocity v of the motor based on the detected output current io. The estimation unit 305 estimates the rotor velocity v using a velocity estimation algorithm. Meanwhile, the estimation unit 305 can estimate a position of the motor (250) rotor. In the case in which the position of the motor rotor is estimated, the rotor velocity can be calculated using a rotor position since the rotor position has a differential relationship with the velocity v.

The current command generator 310 generates d,q-axis current command values i*d, i*q based on the estimated velocity v, a velocity command value v*, and the optimal phase angle θc. The current command generator 310 can decide an amount I* of the current command values based on the estimated velocity v and the velocity command value v* and can generate the d,q-axis current command values i*d, i*q by employing the calculated optimal phase angle θc. That is, the amount I* of the current command values, the optimal phase angle θc, and the d,q-axis current command values i*d, i*q have the following Equation 1 relationship.

$$i^*_d = I^* \cos \theta_c, i^*_q = I^* \sin \theta_c \qquad \text{Equation 1}$$

That is, the current command generator 310 can include a PI controller (not shown) for generating the d,q-axis current command values i*d, i*q, and a d,q-axis current command limit unit (not shown) for limiting the levels of the d,q-axis current command values i*d, i*q so that the d,q-axis current command values i*d, i*q do not exceed specific values.

The voltage command generator 320 generates d,q-axis voltage command values v*d, v*q based on the d,q-axis current command values i*d, i*q and a detected output current io. That is, the voltage command generator 320 can include a PI controller (not shown) for generating the d,q-axis voltage command values v*d,v*q, and a d,q-axis voltage command limit unit (not shown) for limiting the levels of the d,q-axis voltage command values v*d,v*q so that the d,q-axis voltage command values v*d,v*q do not exceed specific values.

The switching control signal output unit 330 outputs the switching control signal Sic based on the d,q-axis voltage command values v*d, v*q in order to drive the inverter switching elements. The switching control signal Sic is applied to the gate terminal of the inverter (220) switching elements and controls on/off of the inverter switching elements.

Meanwhile, it has been shown in the drawing that the output current io is input to the voltage command generator 320, but the present invention is not limited thereto. The output current io may be a value transformed into rotating reference frames of the d,q axes.

Figure 4:
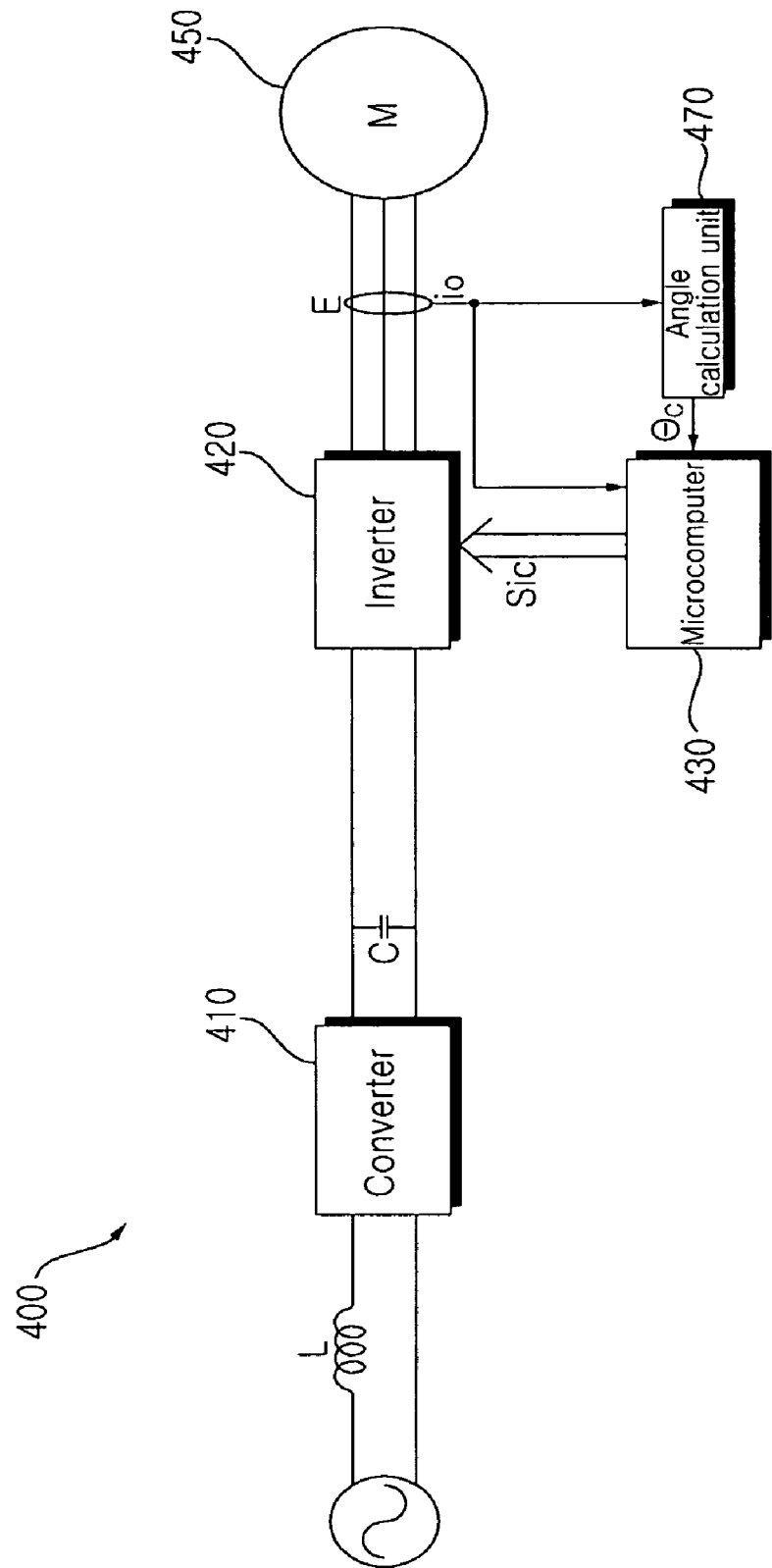
FIG. 4 is a block diagram showing a motor controller of an air conditioner in accordance with an embodiment of the present invention.

FIG. 4 is a block diagram showing a motor controller of an air conditioner in accordance with an embodiment of the present invention.

Referring to the drawing, the motor controller 400 of the air conditioner in accordance with an embodiment of the present invention includes an inverter 420, a microcomputer 430, and an angle calculation unit 470. The motor controller 400 of the air conditioner in accordance with an embodiment of the present invention further includes output current detection means E. The motor controller 400 of the air conditioner in accordance with an embodiment of the present invention may further include a converter 410, a reactor L, a smoothing capacitor C, and so on.

The motor controller 400 of the air conditioner of FIG. 4 is similar to the motor controller 200 of the air conditioner of FIG. 2. That is, the reactor L, the converter 410, the inverter 420, the microcomputer 430, and the smoothing capacitor C have the same operations as those of FIG. 2. Hereinafter, description is given on the basis of a difference between the motor controller 400 of FIG. 4 and the motor controller 200 of FIG. 2.

The output current detection means E detects an output current io flowing through a motor 450. Description on the output current detection means E is almost identical to that of FIG. 2. However, the detected output current io is input to the microcomputer 430 and the angle calculation unit 470.

The angle calculation unit 470 calculates an optimal phase angle θc of a current command value based on the output current io. The optimal phase angle θc of the current command value may be a phase angle when an amount of the output current io is a minimum. That is, the optimal phase angle θc of the current command value may be decided at the inflection point of the output current io.

Meanwhile, an output current of each phase of the motor 450 can be axially transformed into d,q axes, that is, rotating reference frames. The optimal phase angle θc of a current command value can be decided based on the output current axially transformed into the d,q axes. The optimal phase angle θc of the current command value is simply decided based on the output current io calculated in real-time, as described above. Meanwhile, the calculated optimal phase angle θc is input to the microcomputer 430 and used to generate a switching control signal Sic.

While the invention has been described in connection with the embodiments with reference to the accompanying drawings, it will be understood that those skilled in the art can implement the technical constructions of the present invention in various forms without departing from the technical spirit or indispensable characteristics of the present invention. Therefore, the above-described embodiments should be construed to be illustrative and limitative from all aspects. Furthermore, the scope of the present invention is defined by the appended claims rather than the above detailed description. Thus, the present invention should be construed to cover all modifications or variations induced from the meaning and range of the appended claims and their equivalents.

The motor controller of the air conditioner in accordance with the present invention can be employed to simply decide an optimal phase angle of a current command value in real-time.

What is claimed is:

1. A motor controller of an air conditioner, comprising:
   an inverter, including a plurality of switching elements, adapted to convert a DC voltage, input through switching operations of the switching elements, into an AC voltage and supply the converted voltage to a motor;
   a power calculation unit adapted to calculate a value of electric power applied to the motor;
   an angle calculation unit adapted to calculate an optimal phase angle of a current command value based on the calculated value of electric power; and
   a microcomputer adapted to output an inverter switching control signal to control the switching elements of the inverter based on the optimal phase angle, and
   wherein the microcomputer comprises:
   an estimation unit adapted to estimate a velocity based on output current flowing through the motor;
   a current command generator adapted to generate d,q-axis current command values based on the estimated velocity, a velocity command value, and the optimal phase angle;
   a voltage command generator adapted to generate d,q-axis voltage command values based on the d,q-axis current command values and the output current; and
   a switching control signal output unit adapted to output the inverter switching control signal based on the d,q-axis voltage command values.

2. The motor controller of claim 1, wherein the angle calculation unit calculates a phase angle, when the value of the calculated electric power is a minimum, as an optimal phase angle.

3. The motor controller of claim 1, further comprising:

output current detection means for detecting current flowing through the motor; and output voltage detection means for detecting a voltage applied to the motor, wherein the power calculation unit calculates the value of electric power based on the output current and the output voltage.

4. A motor controller of an air conditioner, comprising:

an inverter, including a plurality of switching elements, adapted to convert a DC voltage, input through switching operations of the switching elements, into an AC voltage and supply the converted voltage to a motor;

an angle calculation unit adapted to calculate an optimal phase angle of a current command value based on an output current flowing through the motor; and a microcomputer adapted to output an inverter switching control signal to control the switching elements of the inverter based on the optimal phase angle, and wherein the microcomputer comprises:

an estimation unit adapted to estimate a velocity based on the output current;

a current command generator adapted to generate d,q-axis current command values based on the estimated velocity, a velocity command value, and the optimal phase angle;

a voltage command generator adapted to generate d,q-axis voltage command values based on the d,q-axis current command values and the output current; and a switching control signal output unit adapted to output the inverter switching control signal based on the d,q-axis voltage command values.

5. The motor controller of claim 4, wherein the angle calculation unit calculates a phase angle, when an amount of the output current is a minimum, as an optimal phase angle.

6. The motor controller of claim 4, further comprising output current detection means for detecting an output current flowing through the motor.

* * * * *